(12) United States Patent
Hacker

(10) Patent No.: US 10,937,061 B2
(45) Date of Patent: Mar. 2, 2021

(54) TARGETED ADVERTISING SYSTEM AND METHOD FOR DRIVERS

(71) Applicant: Craig Hacker, Wayne, NJ (US)

(72) Inventor: Craig Hacker, Wayne, NJ (US)

(*) Notice: Subject to any disclaimer, the term of this patent is extended or adjusted under 35 U.S.C. 154(b) by 11 days.

(21) Appl. No.: 16/190,828

(22) Filed: Nov. 14, 2018

(65) Prior Publication Data

US 2019/0087864 A1     Mar. 21, 2019

Related U.S. Application Data

(63) Continuation of application No. 15/809,307, filed on Nov. 10, 2017.

(60) Provisional application No. 62/420,799, filed on Nov. 11, 2016.

(51) Int. Cl.
*G06Q 30/02* (2012.01)
*G06K 15/02* (2006.01)
*H04N 1/00* (2006.01)

(52) U.S. Cl.
CPC ....... *G06Q 30/0266* (2013.01); *G06K 15/024* (2013.01); *G06Q 30/0257* (2013.01); *G06Q 30/0269* (2013.01); *H04N 1/0019* (2013.01)

(58) Field of Classification Search
USPC .............. 705/14.66, 16.62, 14.64; 382/100
See application file for complete search history.

(56) References Cited

U.S. PATENT DOCUMENTS

| 8,447,067 | B2* | 5/2013 | Rhoads ................ G06Q 30/02 382/100 |
| 8,719,094 | B1 | 5/2014 | Klein et al. |
| 8,825,527 | B2 | 9/2014 | Urbanski et al. |
| 8,984,147 | B1 | 3/2015 | Kret et al. |
| 9,058,619 | B2 | 6/2015 | Nandakumar et al. |
| 2002/0046084 | A1* | 4/2002 | Steele ................ G06Q 30/02 705/14.64 |
| 2003/0233275 | A1* | 12/2003 | Melvin ................ G06Q 30/02 705/14.66 |
| 2009/0234726 | A1 | 9/2009 | Bhandari |

(Continued)

FOREIGN PATENT DOCUMENTS

| WO | 2012174519 A2 | 12/2012 |
| WO | 2014085186 A1 | 6/2014 |
| WO | 2015134921 A1 | 9/2015 |

OTHER PUBLICATIONS

"Eyedea", <http://www.eyedea.cz/> (accessed Feb. 28, 2018).

*Primary Examiner* — Afaf Osman Bilal Ahmed
(74) *Attorney, Agent, or Firm* — Gearhart Law LLC

(57) ABSTRACT

An advertising system and its method of use are disclosed. The advertising system includes at least one sensor coupled to a fixed location, where the at least one sensor is configured to generate an impression based on at least one characteristic of a proximate automobile, at least one processor configured to receive the impression, at least one server, having an advertising database and a user database, and at least one delivery mechanism. Preferably, the advertising database contains information relating to at least one advertisement and the user database is configured to check if the at least one characteristic matches an existing entry for a user, and either associate that impression with a user or create a new entry for the impression.

17 Claims, 11 Drawing Sheets

(56) References Cited

U.S. PATENT DOCUMENTS

| | | | |
|---|---|---|---|
| 2010/0179878 A1* | 7/2010 | Dawson | G06Q 30/00 705/14.62 |
| 2011/0078024 A1 | 3/2011 | Messier et al. | |
| 2014/0040016 A1 | 2/2014 | Amla et al. | |
| 2014/0095309 A1 | 4/2014 | MacNeille et al. | |
| 2014/0249913 A1 | 9/2014 | Endo | |
| 2014/0257949 A1 | 9/2014 | Gishen | |
| 2014/0316900 A1 | 10/2014 | Amla et al. | |
| 2015/0095124 A1 | 4/2015 | Felt et al. | |
| 2015/0254720 A1 | 9/2015 | Newberg et al. | |
| 2015/0332330 A1 | 11/2015 | Dawson et al. | |

\* cited by examiner

TARGETED ADVERTISING SYSTEM AND METHOD FOR DRIVERS

CLAIM OF PRIORITY

This non-provisional application is a continuation of U.S. non-provisional application Ser. No. 15/809,307, filed on Nov. 10, 2017, which claims priority to U.S. provisional application 62/420,799 filed on Nov. 11, 2016, the contents of both of which are fully incorporated by reference in its entirety.

FIELD OF THE EMBODIMENTS

The field of the present invention and its embodiments relates to a targeted advertising system and method for drivers. In particular, the present invention and its embodiments relate to a system for identifying an automobile, determining information about the driver of that automobile, and delivering targeted advertising to that driver.

BACKGROUND OF THE EMBODIMENTS

Targeted advertising is a type of advertising that allows advertisers to choose specific targets for their advertisements. Instead of advertising generally to the public, advertisers will only display their advertisements to people who are likely to purchase what is being advertised. For example, suppose there is an advertiser who is attempting to sell a product that has a small market, such as ceiling tiles. Ordinary consumers rarely have a need to purchase this product, so purchasing advertising space on network TV may not be an efficient way to reach potential customers. However, due to improvements in advertising technology, targeted advertising has become a part of every-day life. While targeted advertising on the internet was once a valuable tool, the market has become crowded and now the majority of advertisers engage in this type of advertising. As such, there is a need for advertisers to utilize the methods of targeted advertising in non-computer settings.

Review of Related Technology

U.S. Pat. No. 8,719,094 pertains to computer-implemented methods for notifying a user of a promotional offer based on a travel route. In one aspect, a method includes determining a travel route, from an origin location to a destination location, of a user. The method further includes calculating a distance from at least one point on the travel route one or more retail locations offering a promotional offer. The method further includes selecting, based on the calculated distance, at least one of the one or more retail locations offering the promotional offer. The method further includes determining a time to notify the user of the promotional offer offered by the selected retail location(s). The method further includes providing for notifying the user at the determined time, of the promotional offer offered by the selected retail location(s).

U.S. Pat. No. 8,825,527 pertains to a software based system and method of displaying location based information from an information site on a network by determining location data of a user of the location based information on the network. The location based information is generated based on the determined location data of the user; and generated location based information is provided to the user over the network.

U.S. Pat. No. 8,984,147 pertains to methods, systems, and apparatuses, including computer program products, which may be used for content delivery. In particular implementations, methods, systems, and apparatuses may include the ability to identify that a content item request for a user device has been received, determine a position and velocity of the user device, select a content item to provide to the user device based at least on its position and velocity, and sending the content item to the user device.

U.S. Pat. No. 9,058,619 pertains to a system for measurement, planning, monitoring and execution of advertisements on out-of-home media. The invention provides a method by which greater eyeball content is ensured to out-of-home media assets thereby benefiting advertisers and ensuring efficient advertising budget spend.

United States Patent Publication No.: 2009/0234726 pertains to systems and methods for providing targeted advertising content to a user in an automobile based on location are provided. More specifically, a computing device within the automobile receives advertising content from endpoints at various locations. The advertising content received may be an audio advertisement, a displayed advertisement presented on a display device associated with the computer, etc. Further, the advertising content may be from an entity associated with the endpoint, or may be from an entity not associated with the endpoint, that has dealt directly with the other entity in providing advertising content to the user.

United States Patent Publication No.: 2010/0179878 pertains to a system that may be used with a first database, a second database and a global positioning system, wherein the first database has advertising content data and advertising correlation data stored therein, wherein the second database has identifying data and correlation data stored therein and wherein the global positioning system is operable to provide a position signal corresponding to a position of the system and the velocity of the system. The system includes a sensor portion, a processor portion and a display portion. The sensor portion is operable to detect a parameter and to generate a detected signal based on the detected parameter. The processor portion is operable to generate a correlation between the detected signal and a portion of the identifying data, to obtain a portion of the advertising content data based on a portion of the correlation data and the advertising correlation data, and to generate a display signal based on the advertising content data and the position signal. The display portion is operable to display data based on the display signal. United States Patent Publication No.: 2011/0078024 pertains to a method for provisioning of advertisement to a user of a vehicle is provided. The method comprises determining information comprising attributes associated with behavior of the user, analyzing the information of the user and communicating at least one advertisement to the user wherein the at least one advertisement is based on the analyzed information.

United States Patent Publication No.: 2014/0040016 pertains to dynamically changing targeted advertising content which is dispatched wirelessly in real time via a cellular network from a remote web portal to a plurality of vehicles, and ads are displayed on a digital display mounted in a rear window of the vehicles. Vehicles communicate wirelessly to the web portal their geographic location, and cameras are used to record the effect of the ads on viewers in following vehicles. Ads are changed based upon criteria established by advertisers, changing vehicle geographic locations, and changing conditions such as areas, times of day, traffic on roads, and profiles of viewers.

United States Patent Publication No.: 2014/0095309 pertains to a computer implemented method includes retrieving one or more data elements relating to user shopping habits. The method also includes identifying one or more merchants along a route corresponding to the one or more data elements. The method further includes identifying at least one advertisement for at least one of the one or more merchants. Also, the method includes presenting the advertisement to a vehicle occupant, as a vehicle moves within a perimeter of a merchant for which an advertisement has been identified.

United States Patent Publication No.: 2014/0249913 pertains to an information management center transmits advertisement information to a vehicle. The vehicle displays a predetermined advertisement on a body display part based on the transmitted advertisement information. After a predetermined time has passed since the display of the advertisement by the body display part ended, the information management center acquires the results information about change of the sales results of an advertised good which is an object of a predetermined advertisement from the store existing within a predetermined distance from a location of the body display part through a network. The information management center returns remuneration to a user of the vehicle which permitted use of the body display part, when a sales volume, for example, is increasing based on the acquired results information.

United States Patent Publication No.: 2014/0257949 pertains to planning the presentation of advertisements to travelers, and includes using a computer and software to receive data pertaining to a departure time, a location of one or more travelers, a starting location of the traveler, and a vendor event, including a time and location for the event. The received information is used to calculate available time between the departure time and the time of the event, and to calculate, for a given mode of travel, a travel time from the starting location to the event location and then to the departure location. The calculated travel time plus a predetermined amount of time at the event location is compared with the calculated amount of time available, and if the calculated amount of time available is at least equal, present an advertisement corresponding to the vendor event to the traveler.

United States Patent Publication No.: 2014/0316900 pertains to dynamically changing targeted advertising content which is dispatched wirelessly in real time via a cellular network from a remote web portal to a plurality of vehicles, and ads are displayed on a digital display mounted in a rear window of the vehicles. Vehicles communicate wirelessly to the web portal their geographic location, and cameras are used to record the effect of the ads on viewers in following vehicles. Ads are changed based upon criteria established by advertisers, changing vehicle geographic locations, and changing conditions such as areas, times of day, traffic on roads, and profiles of viewers.

United States Patent Publication No.: 2015/0095124 pertains to a system and method for displaying marketing content at a predetermined location and at a predetermined time is disclosed. The marketing content may be displayed on a mobile vehicle unit and also distributed to a mobile device within the proximity of the mobile vehicle unit. Various categories or criteria may be tagged to the marketing content and may be displayed or distributed only when the various criteria are satisfied. The displays may be mobile or non-mobile and the marketing content, or variations of the marketing content, may be displayed on both the mobile displays or non-mobile displays, either at the same time or at different times.

United States Patent Publication No.: 2015/0254720 pertains to a method for providing real-time location-based advertising within a transit system includes receiving origin information and destination information related to a user's trip using the transit system. The method includes receiving device location information from a mobile device and vehicle location information from a transit vehicle. The device location information includes a location of the mobile device, and the vehicle location information includes a location of the transit vehicle. The method includes matching an advertisement profile with one or more of the device location information, the vehicle location information, the original information, or the destination information to identify an advertisement. The method includes causing a display of a remote device to reproduce an electronic version of the identified advertisement and providing real-time arrival time information to the user's mobile device. The real-time arrival time information is based on the vehicle location and the destination information.

United States Patent Publication No.: 2015/0332330 pertains to a method and system of providing advertising to a moving target vehicle. At least one sensor device coupled to a moving advertising vehicle detecting a parameter associated with the moving target vehicle. The detected parameter is received by a global positioning system (GPS) device. Advertising content data pertaining to a topic associated with identification data is obtained. The topic was determined from matching identification data associated with the detected parameter to advertising correlation data. The identification data was determined from matching the detected parameter to data in a personal database. Vehicle data is determined by the at least one sensor device and/or the GPS device in the advertising vehicle. Display of the advertising content data is initiated on a display device in the advertising vehicle to display the advertising content data to the target vehicle according to at least one display parameter that is based on the vehicle data.

International Patent Application No.: WO2012174519 pertains to a method for providing marketing materials from a marketing and information service platform to a vehicle telematics system comprises the steps of receiving route information at an integral telematics system of a vehicle and delivering personalized messages to the telematics system for transmission to a user of the vehicle based on at least one of location and pre-defined preference information corresponding to the route information. A method for providing marketing materials from a marketing and information services platform to a vehicle telematics system comprises the steps of sending route information from the vehicle telematics system integral with a vehicle to the marketing and information service platform remote from the vehicle and receiving personalized messages at the vehicle telematics system from the marketing and information service platform based on at least one of location and pre-defined preference information corresponding to the route information.

International Patent Application No.: WO2014085186 pertains to a system for inserting stored advertising content into broadcast content being played over an audio system. The system may have a smartphone in wireless communication with the audio system which runs an application relating to a specific broadcast station that is broadcasting the broadcast content. The audio system may have a processing system for detecting breaks in program content that forms part of the broadcast content. The audio system may further be configured to obtain predetermined advertisements and to play back the predetermined advertisements over the audio system during each break in the program content, in place of advertisements contained in the broadcast content.

International Patent Application No.: WO2015134921 pertains to a method for providing real-time location-based advertising within a transit system includes receiving origin information and destination information related to a user's trip using the transit system. The method includes receiving device location information from a mobile device and vehicle location information from a transit vehicle. The device location information includes a location of the mobile device, and the vehicle location information includes a location of the transit vehicle. The method includes matching an advertisement profile with one or more of the device location information, the vehicle location information, the original information, or the destination information to identify an advertisement. The method includes causing a display of a remote device to reproduce an electronic version of the identified advertisement and providing real-time arrival time information to the user's mobile device. The real-time arrival time information is based on the vehicle location and the destination information.

Various systems and methodologies are known in the art. However, their structure and means of operation are substantially different from the present disclosure. The other inventions fail to solve all the problems taught by the present disclosure. The present invention and its embodiments enable advertisers to reach higher-value targets while those targets are going about their day.

At least one embodiment of this invention is presented in the drawings below and will be described in more detail herein.

SUMMARY OF THE EMBODIMENTS

The present invention discloses an advertising system, comprising: at least one sensor, coupled to a fixed location, wherein the at least one sensor is configured to generate an impression based on at least one characteristic of a proximate automobile; at least one processor configured to receive the impression; at least one server, having an advertising database and a user database, wherein the advertising database contains information relating to at least one advertisement, wherein the user database is configured to: check if the at least one characteristic matches an existing entry for a user, and either associate that impression with a user or create a new entry for the impression, and wherein the at least one server performs instructions for correlating the at least one characteristic with at least one advertisement; at least one delivery mechanism, configured to receive and display the correlated advertisement. In another embodiment, the present invention further comprises a global positioning device. In a preferred embodiment, the at least one delivery mechanism is an external display in communicated with the at least one server. In another embodiment, the delivery mechanism is a printer configured to print the correlated advertisement on at least one label and in another the delivery mechanism further comprises a mechanism for placing the at least one label on at least one article. Preferably this delivery mechanism is a printer configured to print the correlated advertisement directly on at least one article. In other embodiments, the at least one characteristic is selected from the group consisting of: a license plate, the shape of a car, a front grill, a headlight configuration, wheelbase, sunroof, make, model, trim, and color. In other preferred embodiments the present invention further comprises a manual control mechanism, comprising: a memory, configured to receive multiple correlated advertisements; a touch-enabled display, to show the multiple correlated advertisements; an interface, allowing a user to choose which of the multiple correlated advertisements to display. In one highly preferred embodiment, the at least one article is a coffee cup.

The present invention also discloses a method of delivering advertisements, comprising the steps of: providing, an advertising system, comprising: at least one sensor, coupled to a fixed location, wherein the at least one sensor is configured to generate an impression based on at least one characteristic of a proximate automobile; at least one processor configured to receive the impression, at least one server, having an advertising database and a user database, wherein the advertising database contains information relating to at least one advertisement, wherein the user database is configured to: check if the at least one characteristic matches an existing entry for a user, and either associate that impression with a user or create a new entry for the impression, and wherein the at least one server performs instructions for correlating the at least one characteristic with at least one advertisement, at least one delivery mechanism, configured to receive and display the correlated advertisement; sensing, by the sensing mechanism, at least one characteristic about the proximate automobile; recording, by the at least one server, the at least one characteristic in the user database; calculating, by the at least one server, a probable destination for the proximate automobile; interfacing, by the at least one server, with a selected one of the at least one delivery mechanisms, wherein the selected delivery mechanism is located near the probable destination; displaying, by the selected delivery mechanism, the correlated advertisement. Preferably, the probable destination is determined from previously recorded information in the user database. Also, the advertising system may further comprise a manual control mechanism, comprising: a memory, configured to receive multiple correlated advertisements; a touch-enabled display, to show the multiple correlated advertisements; an interface, allowing a user to choose which of the multiple correlated advertisements to display. In these embodiments, the method of the present invention also provides for a vendor to choose which correlated advertisements to display, via the manual control mechanism.

In general, the present invention succeeds in conferring the following, and others not mentioned, benefits and objectives.

It is an object of the present invention to provide a means for identifying a user in an automobile or other similar vehicle and displaying targeted advertisements to the user.

DESCRIPTION OF THE PREFERRED EMBODIMENTS

Figure 1:
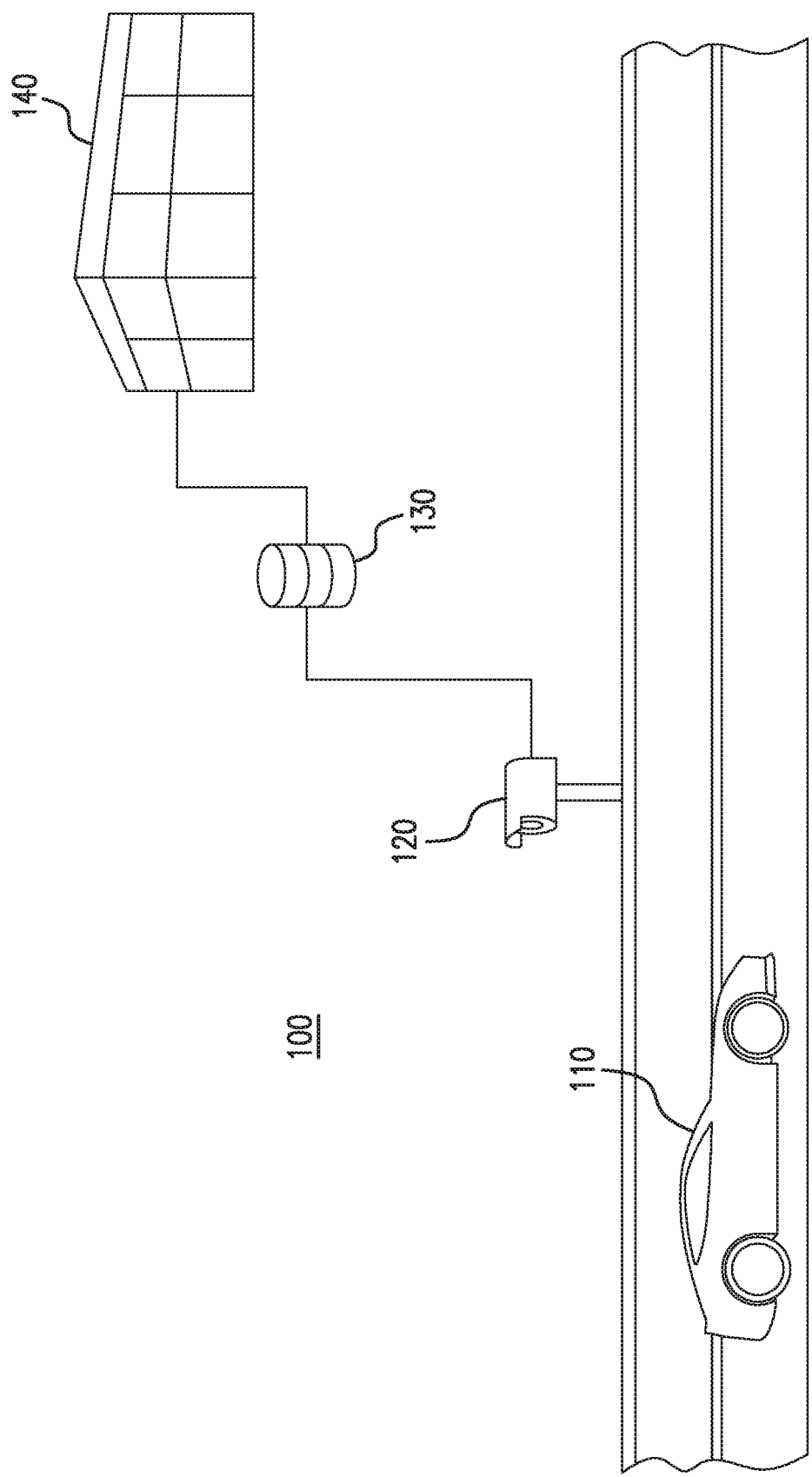
FIG. 1 is a diagram illustrating a system for determining the identity of a user in an automobile, according to an embodiment of the present invention.

In accordance with the present invention, systems and methods are provided for identifying a user in an automobile or other similar vehicle and displaying targeted advertisements to the user.

The preferred embodiments of the present invention will now be described with reference to the drawings. Identical elements in the various figures are identified with the same reference numerals.

The figures represent various embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users (e.g., operators and physicians) table may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table may include fields such as, but not limited to: user_id, client_id, client_ip, client_type, client_model, operating_system, os_version, app_installed_flag, and/or the like. An Apps table may include fields such as, but not limited to: app_ID, app_name, app_type, OS_compatibilities_list, version, timestamp, developer_ID, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

Various other components may be included and called upon for providing for aspects of the teachings herein. For example, additional materials, combinations of materials and/or omission of materials may be used to provide for added embodiments that are within the scope of the teachings herein. In the present application a variety of variables are described, including but not limited to components and conditions. It is to be understood that any combination of any of these variables can define an embodiment of the disclosure. Other combinations of articles, components, conditions, and/or methods can also be specifically selected from among variables listed herein to define other embodiments, as would be apparent to those of ordinary skill in the art.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Referring now to FIG. 1, a system 100 for determining the identity of a user in an automobile is illustratively depicted in accordance with an embodiment of the present invention.

The system 100 includes an automobile 110, being driven by a user (not shown) along a road 115, a camera 120, which may include one or more sensors, a server 130, and a business 140.

According to an embodiment of the present invention, a user drives an automobile 110 along a road 115. As the automobile 110 drives along the road 115, the automobile 110 comes into the view of the camera 120. The camera 120 takes images of the automobile 110 and generates an impression based on at least one characteristic of the automobile 110. These images are then sent to a server 130. According to an embodiment, the server 130 includes an advertising database and/or a user database, which it may or may not receive from a business 140. The advertising database includes information related to at least one advertisement and the user database includes information related to at least one user.

The camera 120 may also include a Global Positioning Device (GPS) for determining the location of a user. Other components of the system 100 may also include GPS's as need be to determine a location of a user.

The server 130 cross references the at least one characteristic in the impression against any existing entries for individual users in the user database to determine if any existing users match the impression. The server 130 either associates the impression with a user or creates a new entry for the impression. If the server 130 associates the impression with a user, the server 130 performs instructions for correlating the at least one characteristic with at least one advertisement, thus correlating the characteristic with the at least one advertisement.

According to an embodiment, based on information about the automobile 110 and the user, the server 130 calculates a probable destination for the automobile 110. The probable destination may be determined from previously recorded information in the user database.

The server 130 may send the results of this correlation to a business 140.

According to an embodiment of the present invention, the server 130 stores information gathered on one or more users or automobiles 110 and uses this stored data to process, determine, and recognize patterns in the user's or automobile's behavior, such as, e.g., determining a home address, a work address, any frequented stores or restaurants, how frequently and at what times does the user or automobile reach certain locations, any changes in destinations between users of the automobiles 110, etc. It is noted that this pattern recognition may be used with any of the embodiments described herein, while maintaining the spirit of the present invention.

According to an embodiment, the server 130 stores information such as, e.g. license plate numbers, make of automobiles 110, model of automobiles 110, year of automobiles 110, physical characteristic of any users in the automobiles 110, etc. According to an embodiment, this cataloged information is used for future marketing and sales. According to an embodiment, the server 130 communicates cataloged data with a $3^{rd}$ party service, such as, e.g., Carfax, Polk, or similar companies or services in order to create detailed customer profiles.

According to an embodiment, when an automobile 110 drives past a location, the server 130 determines the identity of a user in the automobile 110 and displays an advertisement marketed specifically for the user. According to an embodiment, the profiles of the users are repeatedly updated, enabling the system 100 to alter which advertisements are marketed to the user by basing the advertisements on the updates profile.

According to an embodiment, individuals, groups, companies, etc. are able to budget a fixed monetary amount to be spent on advertisements on a daily, weekly, monthly, or yearly basis.

Figure 2:
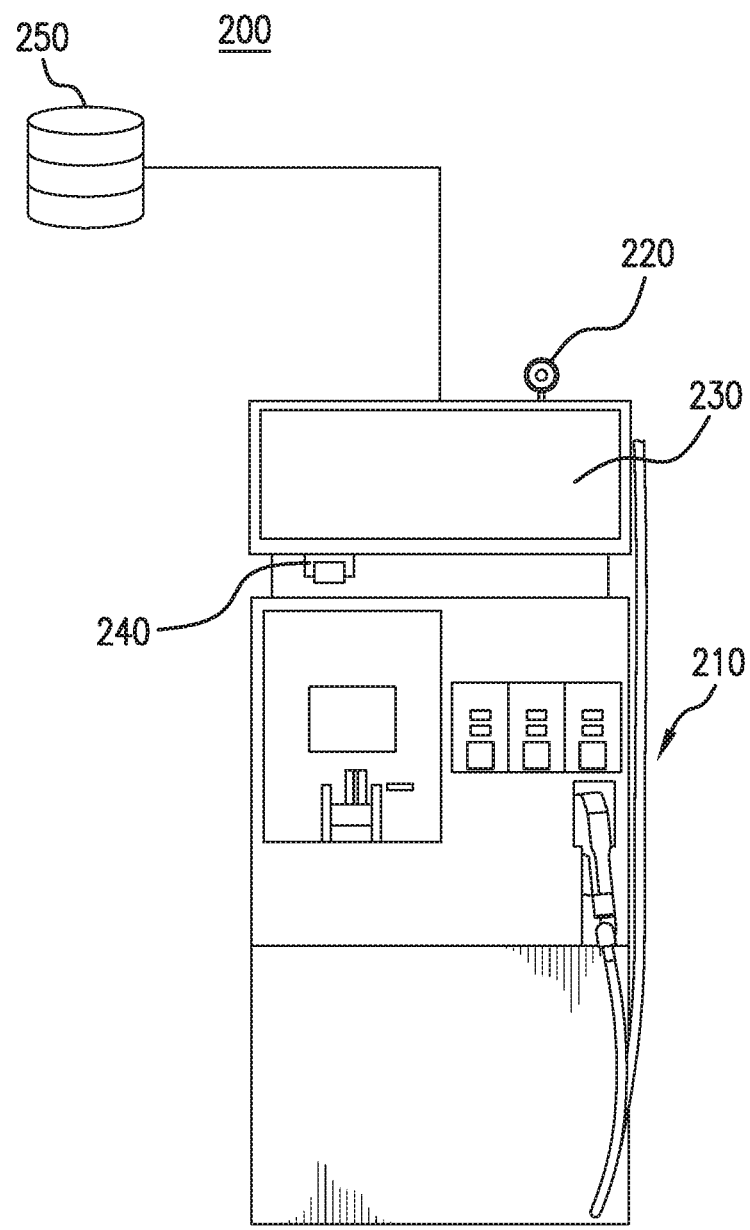
FIG. 2 is a diagram of a system for identifying a user and displaying an advertisement to a user at a gas pump, according to an embodiment of the present invention.

Referring now to FIG. 2, a system 200 for identifying a user and displaying an advertisement to a user at a gas pump 210 is illustratively depicted in accordance with an embodiment of the present invention.

The system 200 includes a gas pump 210, a camera 220, which may include one or more sensors, a display screen 230, a printer 240, and a server 250.

As an automobile (not shown) pulls next to the gas pump 210, the camera 220 takes images of the automobile and is generates an impression based on at least one characteristic of the automobile. The impression is then sent to the server 250, which includes an advertising database and/or a user database. The server 250 cross references the at least one characteristic in the impression against any existing entries for individual users in the user database to determine if any existing users match the impression. The server 250 then performs instructions for correlating the at least one characteristic with at least one advertisement, thus correlating the characteristic with the at least one advertisement.

According to an embodiment of the present invention, the server 250 sends the at least one correlated advertisement to the gas pump 210, where it is displayed onto the display screen 230. The displayed advertisement may be an image or a video. However, other types of digital advertisements may also be used. The advertisement may also be printed, using a printer 240 so that the user may take a physical copy of the advertisement.

According to an embodiment, system 200 determines the identity of a user and displays, on the display screen 230, an advertisement marketed specifically to the identified user.

Figure 3:
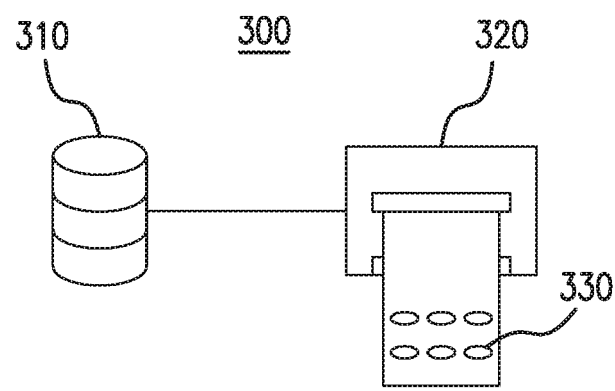
FIG. 3 is a diagram of a system for printing advertisements, according to an embodiment of the present invention.

Referring now to FIG. 3, a system 300 for printing advertisements 330 is illustratively shown in accordance with an embodiment of the present invention.

The system 300 includes a server 310 and a printing device 320 to print physical advertisements 330.

According to an embodiment of the present invention, after a server 310 correlates an advertisement with a user, the server 310 sends a digital version of the advertisement to a printing device 320, wherein the printing device 320 prints a physical copy 330 of the digital advertisement which can be taken by the user. The advertisements can be, e.g., printed coupons, tags, tear-off coupons or advertisements, adhesive coupons or advertisements, etc. It is noted that these and other forms of printed advertisements may be used with any of the embodiments described herein, while maintaining the spirit of the present invention. Printed coupons and advertisements may also be specific to the make or model of the automobile 110 that a user is driving, if the user is driving an automobile.

Figure 4:
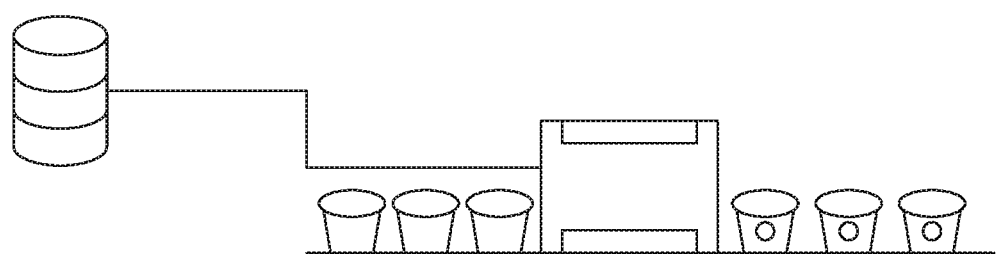
FIG. 4 is a diagram of a system for placing advertisements onto objects, according to an embodiment of the present invention.

Referring now to FIG. 4, a system 400 for placing advertisements onto objects 430 is illustratively shown in accordance with an embodiment of the present invention.

The system 400 includes a server 410 and a printing device 420 for printing advertisements onto stickers 440 and placing the stickers 440 onto objects 430.

According to an embodiment of the present invention, after a server 410 correlates an advertisement with a user, the server 410 sends a digital version of the advertisement to a printing device 420. The printing device 420 subsequently prints the advertisement onto a sticker 440 and places the sticker onto an object 430 designed to be taken by the user.

Figure 5:
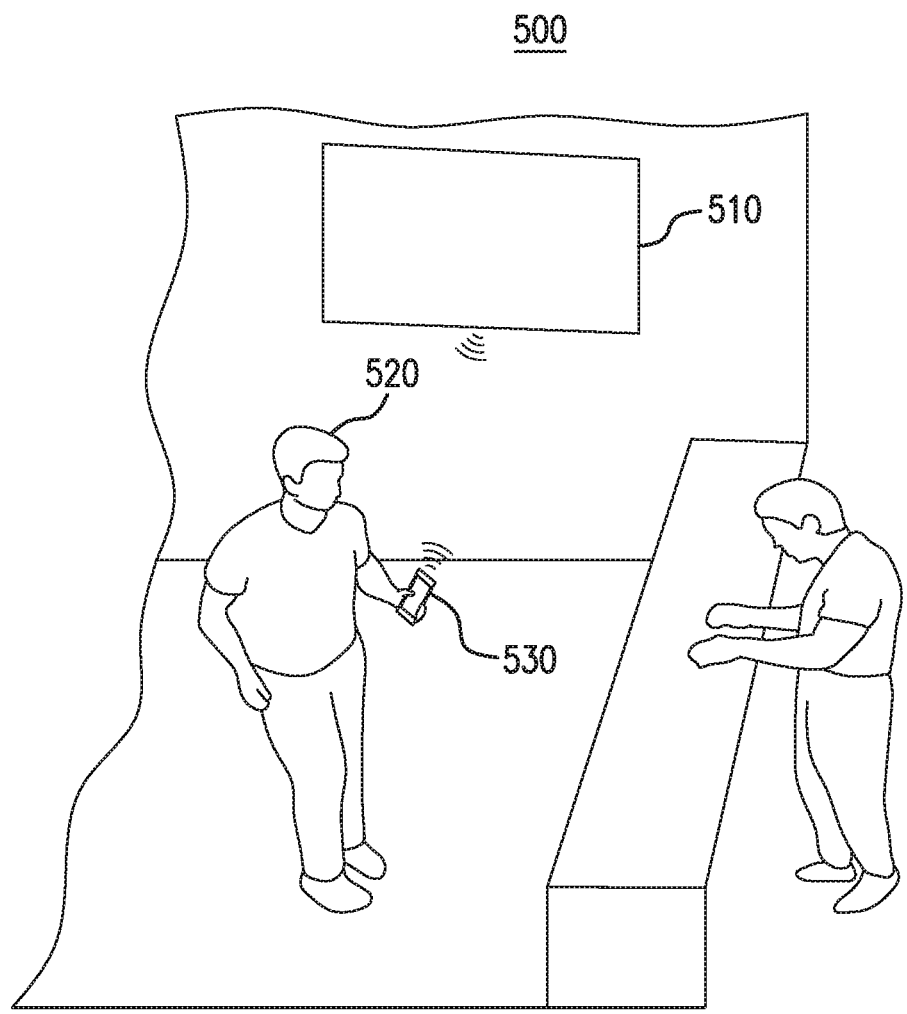
FIG. 5 is a diagram of a system for displaying an advertisement to a user on a manual control station, according to an embodiment of the present invention.

Referring now to FIG. 5, a system 500 for displaying an advertisement to a user 520 on a manual control station 530 is illustratively depicted in accordance with an embodiment of the present invention.

The system 500 includes a display screen 510, a user 520, and a manual control mechanism 530 such as, e.g., a cell phone, a tablet computer, etc.

According to an embodiment of the present invention, once a user 530 has been identified, one or more advertisements are sent to the user's manual control mechanism 530. In an embodiment, the manual control mechanism 530 includes a memory configured to receive multiple correlated advertisements, a touch-enabled display configured to show the multiple correlated advertisements, and an interface configured to enable the user 520 to choose which of the multiple correlated advertisements to display.

In another embodiment, the one or more advertisements may be displayed onto a display screen 510.

Figure 6:
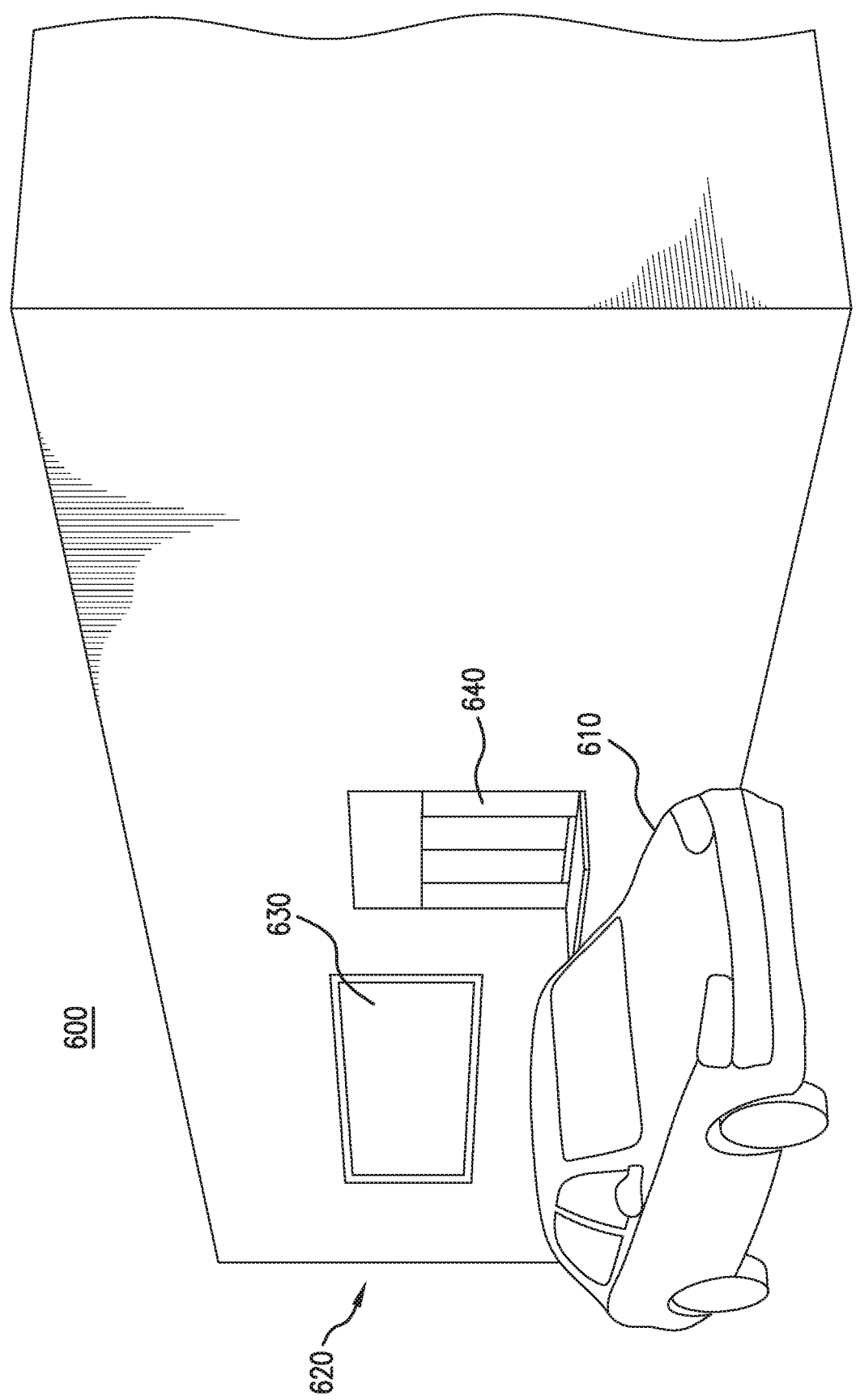
FIG. 6 is a diagram of a system for displaying an advertisement to a user in an automobile at a business drive thru, according to an embodiment of the present invention.

Referring now to FIG. 6, a system 600 for displaying an advertisement to a user in an automobile 610 at a business drive thru 620 is illustrated in accordance with an embodiment of the present invention.

The system 600 includes an automobile 610 housing a user, and a business drive thru 620 which includes a display screen 630 and a drive thru window 640.

According to an embodiment of the present invention, a user has been correlated with one or more advertisements. As the automobile 610 housing the user drives up to a drive thru window 640, the automobile passes by a display screen 630. As the automobile 610 passes by the display screen 630, the display screen 630 displays the one or more advertisements correlated with the user so that the one or more advertisements are visible by the user.

Figure 7:
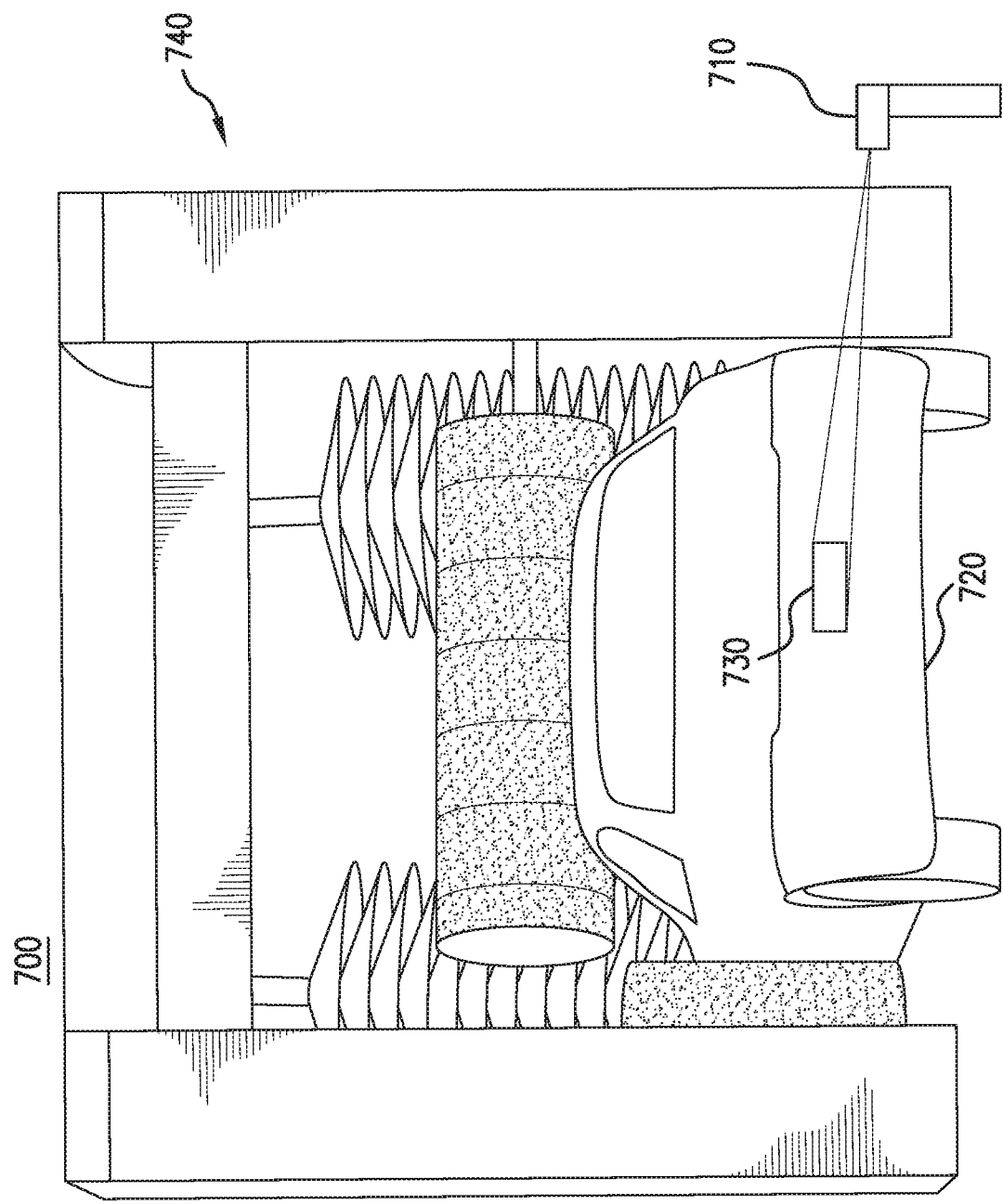
FIG. 7 is a diagram of a system for determining the identity of a user in an automobile at a car wash, according to an embodiment of the present invention.

Referring now to FIG. 7, a system 700 for determining the identity of a user in an automobile 720 at a car wash 740 is illustratively depicted in accordance with an embodiment of the present invention.

The system 700 includes a camera 710, which may include one or more sensors, an automobile 720, and a car wash 740.

According to an embodiment of the present invention, an automobile 720 enters a car wash 740. As the automobile 720 enters the car wash 740, the camera 710 takes pictures of the automobile 720 and generates an impression based on at least one characteristic of the automobile 720. The characteristics 730 may include views of the automobile's license plate, shape, front grill, headlight configuration, wheelbase, sunroof, make, model, trim, color, etc.

Figure 8:
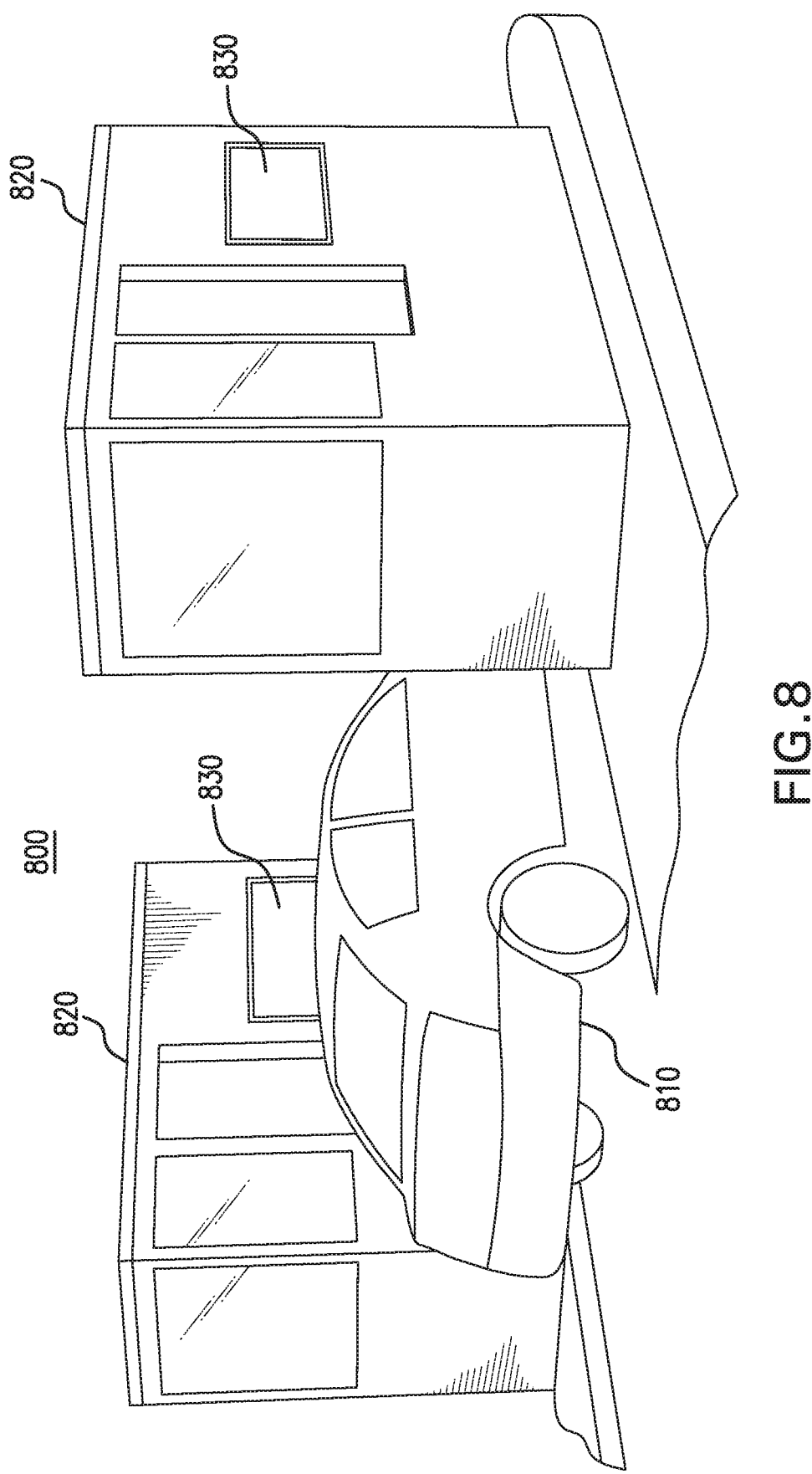
FIG. 8 is a diagram of a system for displaying an advertisement to a user in an automobile at a toll booth, according to an embodiment of the present invention.

Referring now to FIG. 8, a system 800 for displaying an advertisement to a user in an automobile 810 at a toll booth 820 is illustratively depicted in accordance with an embodiment of the present invention.

The system 800 includes an automobile 810 and one or more toll booths 820 which include one or more display screens 830.

According to an embodiment of the present invention, a user has been correlated with one or more advertisements. As the automobile 810 housing the user drives up to a toll booth 820, the automobile passes by a display screen 830. As the automobile 810 passes by the display screen 830, the display screen 830 displays the one or more advertisements correlated with the user so that the one or more advertisements are visible by the user.

Figure 9:
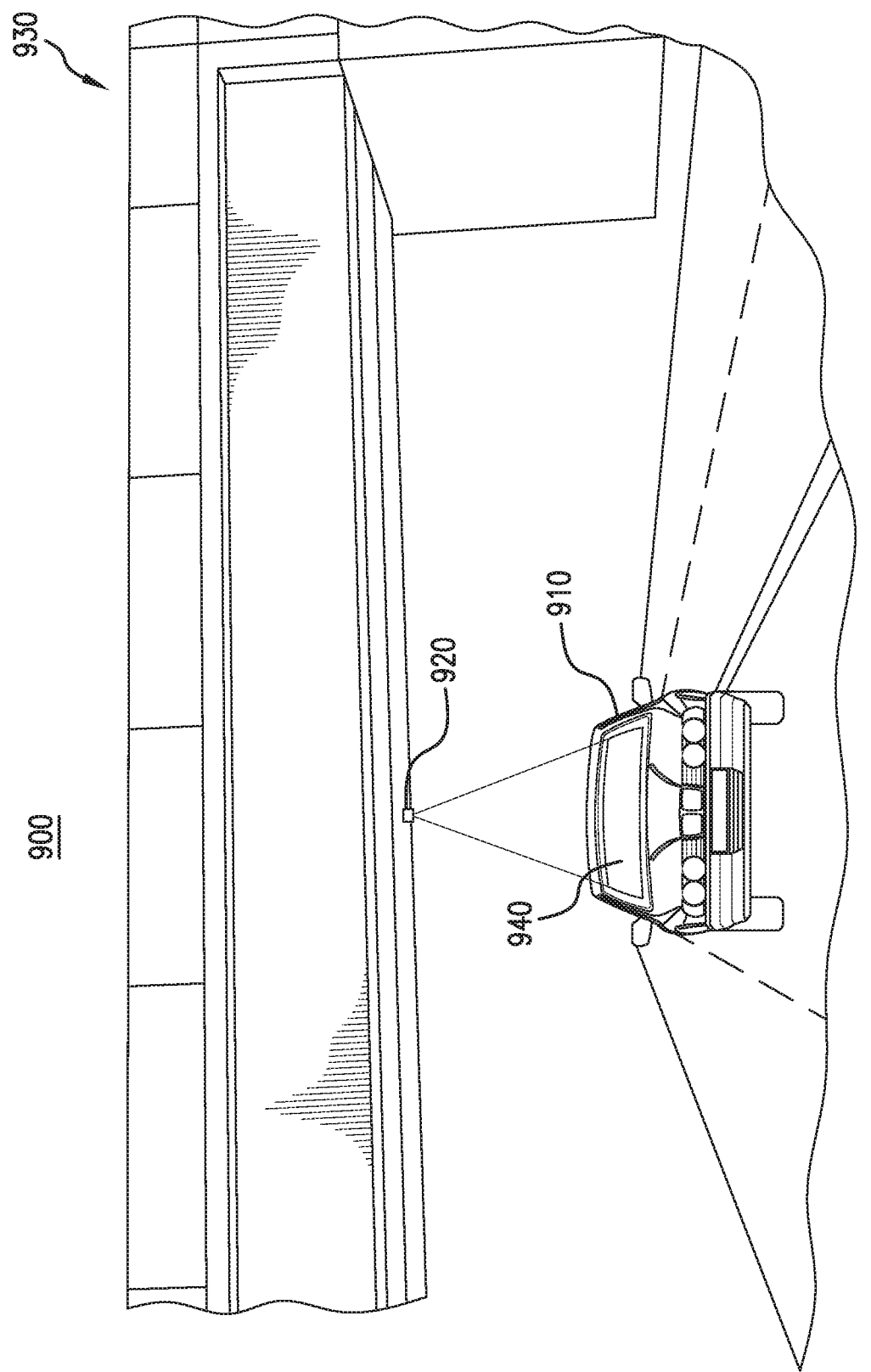
FIG. 9 is a diagram of a system for projecting an advertisement to a user in a self-driving vehicle, according to an embodiment of the present invention.

Referring now to FIG. 9, a system 900 for projecting an advertisement to a user in a self-driving vehicle 910 is illustratively depicted in accordance with an embodiment of the present invention.

The system 900 includes a self-driving vehicle 910 housing a user, and an overpass 930 having a projector 920 housed at the underside of the overpass 930.

According to an embodiment of the present invention, a user has been correlated with one or more advertisements and is being driven in a self-driving vehicle 910. As the self-driving vehicle 910 passes underneath the overpass 930, the projector 920 projects an image of the one or more advertisements onto the windshield 940 of the self-driving vehicle 910 so that the one or more advertisements are visible to the user inside the self-driving vehicle 910.

Figure 10:
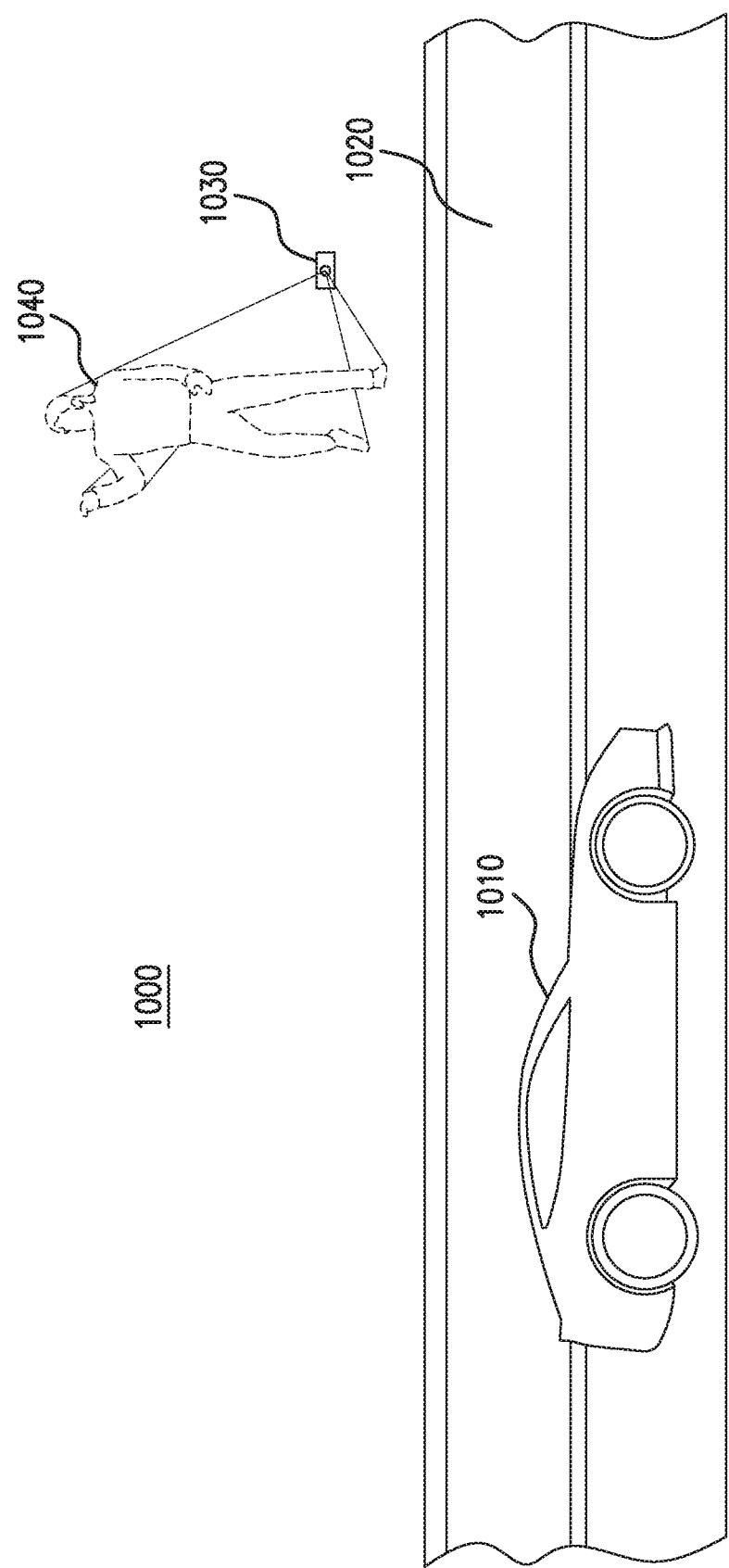
FIG. 10 is a diagram of a system for displaying a holographic advertisement to a user in an automobile, according to an embodiment of the present invention.

Referring now to FIG. 10, a system 1000 for displaying a holographic advertisement 1040 to a user in an automobile 1010 is illustratively depicted in accordance with an embodiment of the present invention.

The system includes an automobile 1010 housing a user, and a holographic projector 1030 designed to project a holographic advertisement 1040 to the user in the automobile 1010.

According to an embodiment of the present invention, a user has been correlated with one or more advertisements. As an automobile 1010 housing a user drives along a road 1020, it passes a holographic projector 1030. As the automobile 1010 passes the holographic projector 1030, the holographic projector 1030 projects a holographic image 1040 of the one or more advertisements. In an embodiment, the holographic image 1040 is projected onto a transparent medium.

In embodiments of the present invention, system 1000 may be used at airports and seaports. However, other locations may also be used in accordance with the present principles.

Figure 11:
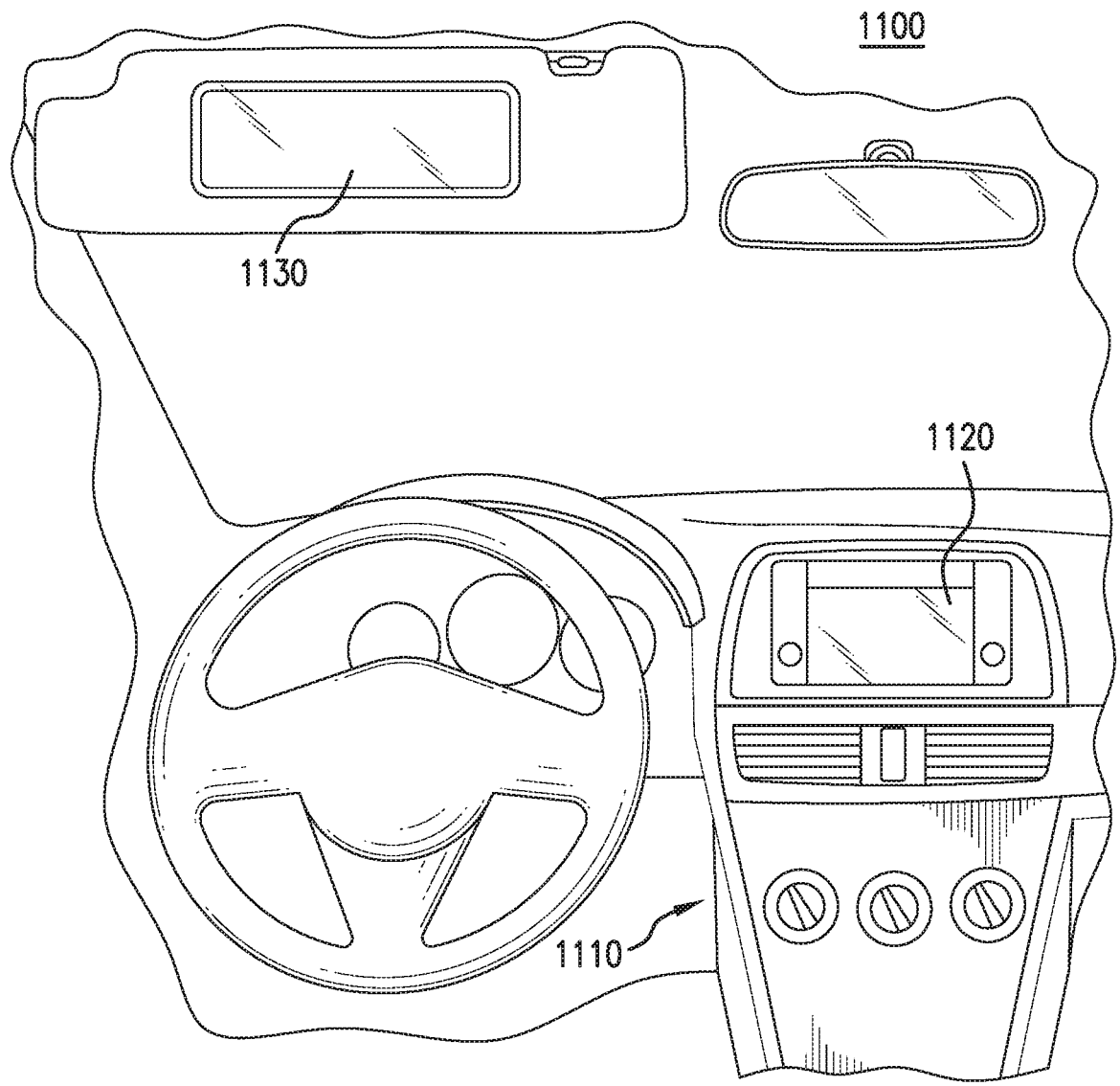
FIG. 11 is a diagram of a system for displaying an advertisement on an electronic mirror within a vehicle compartment, according to an embodiment of the present invention.

Referring now to FIG. 11, a system 1100 for displaying an advertisement on a fold-down visor mirror 1130 within a vehicle compartment 1110 is illustratively depicted in accordance with an embodiment of the present invention.

The system 1100 includes a vehicle compartment 1110 located within a vehicle and which includes a navigation/information display 1120 and a fold-down visor mirror 1130.

According to an embodiment of the present invention, an image of an advertisement is displayed on the fold-down visor mirror 1130 so that the advertisement is visible to a user housed within the vehicle.

Figure 12:
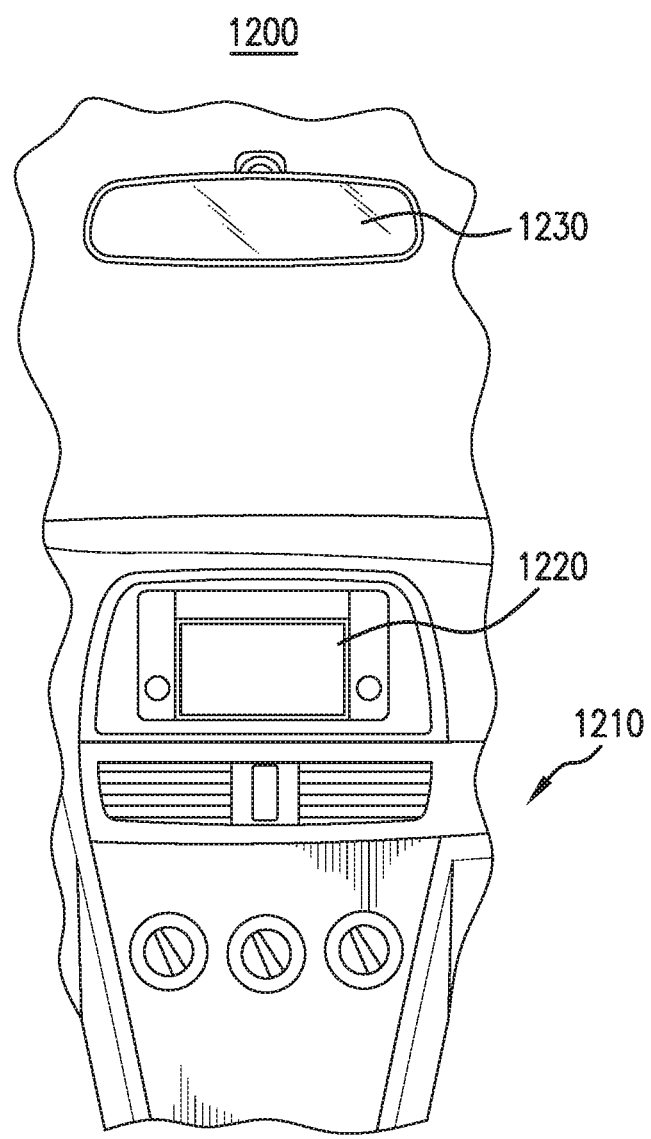
FIG. 12 is a diagram of a system for displaying an advertisement on a navigation/information display within a vehicle compartment, according to an embodiment of the present invention.

Referring now to FIG. 12, a system 1200 for displaying an advertisement on a navigation/information display 1220 within a vehicle compartment is illustratively depicted in accordance with an embodiment of the present invention.

The system 1200 includes a vehicle compartment 1210 located within a vehicle and which includes a navigation/information display 1220 and a rear-view mirror 1230.

According to an embodiment of the present invention, an image of an advertisement is displayed on the navigation/information display 1220 so that the advertisement is visible to a user housed within the vehicle.

According to various embodiments of the present invention, it is noted that all or part of the systems and methods described herein may be used in various businesses and locations such as, e.g., jewelry stores, supermarkets, delicatessens, sports stadiums and arenas, car dealerships, restaurants, etc.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. An advertising system, comprising:
a fixed location comprising:
 a printer;
 a display screen;
 a camera comprising one or more sensors, wherein the one or more sensors are configured to detect an automobile proximate the fixed location;
 the camera being configured to:
  capture one or more images of the automobile;
  identify at least one characteristic of the automobile from the one or more images, wherein the at least one characteristic is selected from the group consisting of: a front grill, a headlight configuration, a wheelbase, a sunroof, and a trim:
  generate an impression of the automobile based on the at least one characteristic of the automobile;
  transmit the impression of the automobile to a user database of a server; the server, having an advertising database and the user database,
 the advertising database containing information relating to an advertisement;
 the user database being configured to:
  receive the impression of the automobile from the camera;
  determine if the at least one characteristic of the automobile matches an existing entry for a user;
  in response to a determination that the at least one characteristic of the automobile matches an existing entry for a user, associate the impression with the user:
  in response to a determination that the at least one characteristic of the automobile does not match the existing entry for the user, create a new entry for the impression;
  query the advertising database to correlate the impression of the automobile to the information relating to the advertisement; and
  transmit the advertisement to the display screen for display and the printer to allow the user to print the advertisement.

2. The advertising system of claim 1, further comprising a global positioning device to determine a location of the user.

3. The advertising system of claim 1, wherein the display screen is an external display which is in communication with the server.

4. The advertising system of claim 1, wherein the printer is configured to print the advertisement on a label.

5. The advertising system of claim 4, further comprising: a component for placing the label on an article.

6. The advertising system of claim 5, wherein the article is a coffee cup.

7. The advertising system of claim 1, wherein the is configured to print the advertisement directly on an article.

8. The advertising system of claim 6, wherein the article is a coffee cup.

9. The advertising system of claim 1, wherein the at least one characteristic is further selected from the group consisting of: a license plate associated with the automobile, a shape of the automobile, a make of the automobile, a model of the automobile, and a color of the automobile.

10. The advertising system of claim 1, wherein the server is further configured to correlate the at least one characteristic over a period of time to determine a behavior pattern of the user.

11. The advertising system of claim 1, further comprising:
a manual control mechanism, comprising:
 a memory, configured to receive multiple correlated advertisements;
 a touch-enabled display, to show multiple correlated advertisements; and
 an interface, allowing the user to choose which of the multiple correlated advertisements to display.

12. A method of delivering advertisements via an advertising system comprising a fixed location and a server, the fixed location comprising a printer, a display screen, and a camera, the method comprising the steps of:
detecting, via one or more sensors of the camera, an automobile proximate the fixed location;
identifying, via a global positioning device of the camera, a location of the user;
capturing, via the camera, one or more images of the automobile;
identifying, via the camera, at least one characteristic of the automobile from the one or more images, wherein the at least one characteristic is selected from the group consisting of: a front grill, a headlight configuration, a wheelbase, a sunroof, and a trim;
generating, via the camera, an impression of the automobile based on the at least one characteristic of the automobile;

transmitting, via the camera, the impression of the automobile to a user database of the server;

receiving, via the user database, the impression of the automobile from the camera;

determining, via the user database, if the at least one characteristic of the automobile matches an existing entry for a user;

in response to a determination that the at least one characteristic of the automobile matches an existing entry for a user,
associating, via the user database, the impression with the user;
recording, via the user database, the at least one characteristic of the automobile in the user database; and
identifying, via the user database, a probable destination for the automobile based on previously recorded information comprising: previous locations of the user identified from the global positioning device, previously recorded characteristics of the automobile, and previously recorded impressions;

in response to a determination that the at least one characteristic of the automobile does not match the existing entry for the user,
creating, via the user database, a new entry for the impression; and
recording, via the user database, the at least one characteristic of the automobile in the user database;

querying, via the user database, an advertising database of the server to correlate the impression of the automobile to information relating to an advertisement; and transmitting, via the user database, the advertisement to the display screen for display and the printer to allow the user to print the advertisement.

13. The method of claim 12, the advertising system further comprising:

a manual control mechanism, comprising:
a memory, configured to receive multiple correlated advertisements;
a touch-enabled display, to show the multiple correlated advertisements; and
an interface, allowing the user to choose which of the multiple correlated advertisements to display.

14. The method of claim 13, further comprising the step of:

choosing, by a vendor, which of the multiple correlated advertisements to display, via the manual control mechanism.

15. The method of claim 13, wherein each of the multiple correlated advertisements comprise a video advertisement.

16. The method of claim 13, wherein each of the multiple correlated advertisements comprise an image printed on an article.

17. The method of claim 12, further comprising:

correlating, by the server, the at least one characteristic over a period of time to determine a behavior pattern of the user.

* * * * *